US008897578B2

(12) United States Patent
Huang et al.

(10) Patent No.: US 8,897,578 B2
(45) Date of Patent: Nov. 25, 2014

(54) IMAGE RECOGNITION DEVICE, IMAGE RECOGNITION METHOD, AND INTEGRATED CIRCUIT

(75) Inventors: Zhongyang Huang, Singapore (SG); Yang Hua, Singapore (SG); Shuicheng Yan, Singapore (SG); Qiang Chen, Singapore (SG); Ryouichi Kawanishi, Kyoto (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 36 days.

(21) Appl. No.: 13/817,631

(22) PCT Filed: Aug. 29, 2012

(86) PCT No.: PCT/JP2012/005446
§ 371 (c)(1),
(2), (4) Date: Feb. 19, 2013

(87) PCT Pub. No.: WO2013/065220
PCT Pub. Date: May 10, 2013

(65) Prior Publication Data
US 2014/0193074 A1 Jul. 10, 2014

Related U.S. Application Data

(60) Provisional application No. 61/554,643, filed on Nov. 2, 2011.

(51) Int. Cl.
G06K 9/62 (2006.01)
(Continued)

(52) U.S. Cl.
CPC ............ *G06T 7/0081* (2013.01); *G06K 9/4676* (2013.01)
USPC ........... 382/225; 382/173; 382/180; 382/224; 382/228

(58) Field of Classification Search
CPC ......................... G06K 9/4671; G06K 9/4676
See application file for complete search history.

(56) References Cited

U.S. PATENT DOCUMENTS 7,778,462 B2 * 8/2010 Sinclair et al. ................ 382/173
7,978,918 B2 * 7/2011 Scalise et al. ................. 382/228
(Continued)

FOREIGN PATENT DOCUMENTS

JP 2000-163597 6/2000
JP 2005-50285 2/2005

OTHER PUBLICATIONS

Rahtu et al. "Segmentng salient objects from images and videos", ECCV 2010, Part V, LNCS 6315, pp. 366-379, 2010.*
(Continued)

*Primary Examiner* — Anand Bhatnagar
*Assistant Examiner* — Soo Park
(74) *Attorney, Agent, or Firm* — Wenderoth, Lind & Ponack, L.L.P.

(57) ABSTRACT

An image recognition device that improves the accuracy of generic object recognition compared with conventional technologies by reducing the influence of the position, size, background clutter and the like of an object that is targeted to be recognized in the input image by the generic object recognition. The image recognition device performs a generic object recognition and includes: a segmenting unit configured to segment an input image into a plurality of regions in accordance with meanings extracted from content of the input image; a generating unit configured to compute feature data for each of the plurality of regions and generate feature data of the input image reflecting the computed feature data; and a checking unit configured to check whether or not a recognition-target object is present in the input image in accordance with the feature data of the input image.

7 Claims, 8 Drawing Sheets

(51) Int. Cl.
    *G06K 9/34*  (2006.01)
    *G06K 9/74*  (2006.01)
    *G06T 7/00*  (2006.01)
    *G06K 9/46*  (2006.01)

(56) References Cited

U.S. PATENT DOCUMENTS

| | | | |
|---|---|---|---|
| 8,009,921 B2* | 8/2011 | Csurka | 382/228 |
| 8,326,031 B2* | 12/2012 | Boncyk et al. | 382/165 |
| 8,437,506 B2* | 5/2013 | Williams et al. | 382/103 |
| 8,537,409 B2* | 9/2013 | Marchesotti et al. | 358/1.18 |
| 2002/0154833 A1* | 10/2002 | Koch et al. | 382/325 |
| 2005/0047647 A1* | 3/2005 | Rutishauser et al. | 382/159 |
| 2007/0185946 A1 | 8/2007 | Basri et al. | |
| 2007/0217676 A1 | 9/2007 | Grauman et al. | |
| 2010/0104158 A1 | 4/2010 | Shechtman et al. | |
| 2010/0124377 A1 | 5/2010 | Yu et al. | |
| 2010/0189354 A1* | 7/2010 | de Campos et al. | 382/190 |
| 2011/0116711 A1 | 5/2011 | Wang et al. | |
| 2011/0229045 A1 | 9/2011 | Yu | |
| 2013/0084007 A1* | 4/2013 | Salamati et al. | 382/173 |

OTHER PUBLICATIONS

Csurka et al. "A simple high performance approach to semantic segmentation", British Machine Vision Conference, Sep. 2008.*

Ko et al. "Object-of-interest image segmentation based on human attention and semantic region clustering", JOSA A, vol. 23, issue 10, pp. 2462-2470.*

Ko et al. "Object-of-interest segmentation based on human attention and semantic region clustering", JOSA A, vol. 23, issue 10, pp. 2464-2470, Oct. 10, 2006.*

International Search Report issued Nov. 20, 2012 in International (PCT) Application No. PCT/JP2012/005446.

Svetlana Lazebnik et al., "Beyond Bags of Features: Spatial Pyramid Matching for Recognizing Natural Scene Categories", Proceedings of the 2006 IEEE Computer Society Conference on Computer Vision and Pattern Recognition, 2006.

Gang Wang et al., "Joint learning of visual attributes, object classes and visual saliency", In Proceedings of 2009 IEEE 12th International Conference on Computer Vision, pp. 537-544, 2009.

Laurent Itti et al., "A Model of Saliency-Based Visual Attention for Rapid Scene Analysis", IEEE Transactions on Pattern Analysis and Machine Intelligence, vol. 20, No. 11, Nov. 1998.

* cited by examiner

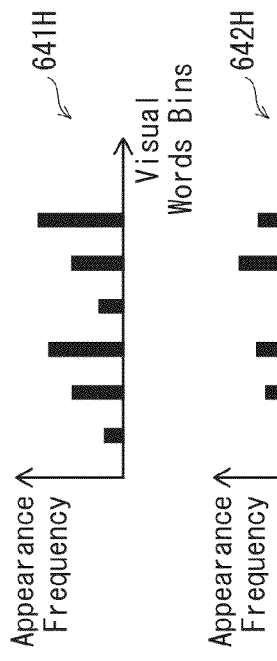
FIG. 7A
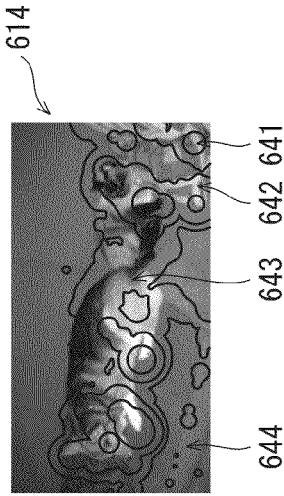
FIG. 7B
FIG. 7C
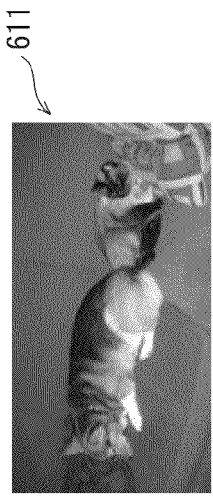
FIG. 7D
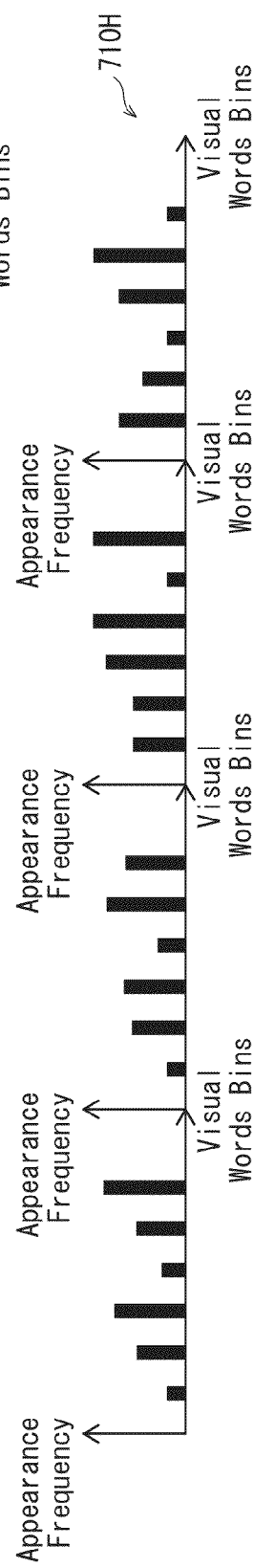

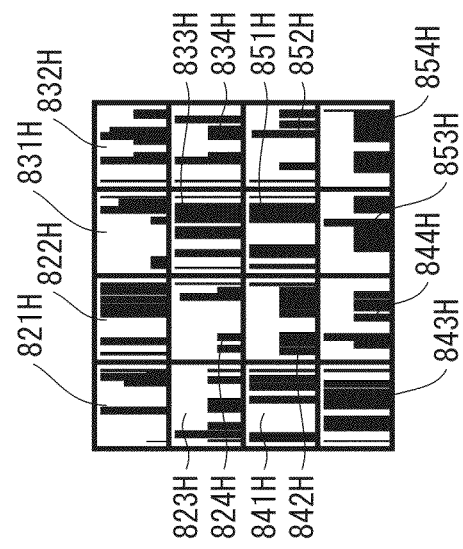
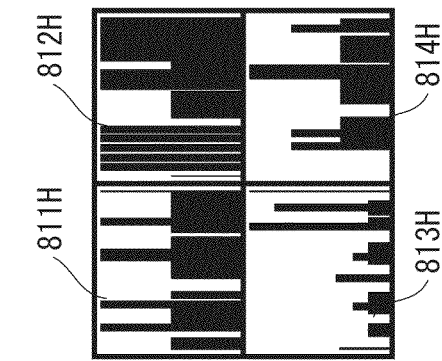
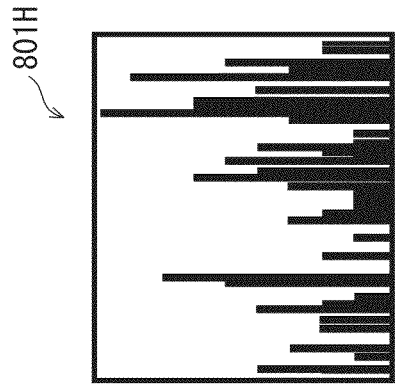

IMAGE RECOGNITION DEVICE, IMAGE RECOGNITION METHOD, AND INTEGRATED CIRCUIT

This application claims benefit to the U.S. Provisional Application No. 61/554,643, filed Nov. 2, 2011.

BACKGROUND OF THE INVENTION

1. Technical Field

The present invention relates to an image recognition technology performing a generic object recognition, and particularly to a pyramid matching technology.

2. Background Art

In recent years, generic object recognition methods using the Spatial Pyramid Matching (SPM) (see Non-Patent Literature 1) have been proposed. In the SPM, a histogram representing the feature of an input image is computed. This computation includes hierarchical segmentation of the input image, which includes segmenting the input image into a plurality of sub-regions and segmenting each sub-region further into a plurality of sub-regions. Histograms are then computed for the respective sub-regions in each pyramid level, and the histograms are concatenated to generate a histogram representing the feature of the input image.

This enables the histogram representing the feature of the input image to reflect the geometrical positional relationship between the sub-regions formed by repeatedly segmenting the input image, thereby improving the accuracy of the generic object recognition.

CITATION LIST

Non-Patent Literature

Non-Patent Literature 1: S. Lazebnik, C. Schmid, and J. Ponce, "Beyond Bags of Features: Spatial Pyramid Matching for Recognizing Natural Scene Categories", Proc. of IEEE Computer Vision and Pattern Recognition, pp. 2169-2178 (2006).
Non-Patent Literature 2: G. Wang and D. Forsyth, "Joint learning of visual attributes, object classes and visual saliency", In Proceedings of IEEE International Conference on Computer Vision, pages 537-544, 2009.
Non-Patent Literature 3: Laurent Itti, Christof Koch, and Ernst Niebur, "A model of saliency-based visual attention for rapid scene analysis", IEEE TRANSACTIONS ON PATTERN ANALYSIS AND MACHINE INTELLIGENCE, VOL. 20, NO. 11, NOVEMBER 1998.

SUMMARY OF INVENTION

However, in the above generic object recognition using the method of repeatedly segmenting the input image into a plurality of sub-regions, it is still necessary to improve the accuracy of recognition.

It is therefore an object of the present invention to provide an image recognition device that improves the accuracy of generic object recognition compared with conventional technologies by reducing the influence of the position, size, background clutter and the like of an object that is targeted to be recognized in the input image by the generic object recognition.

The above object is fulfilled by an image recognition device for performing a generic object recognition, comprising: a segmenting unit configured to segment an input image into a plurality of regions in accordance with meanings extracted from content of the input image; a generating unit configured to compute feature data for each of the plurality of regions and generate feature data of the input image reflecting the computed feature data; and a checking unit configured to check whether or not a recognition-target object is present in the input image in accordance with the feature data of the input image.

With the above-described structure, the image recognition device of the present invention segments the input image not equally in a regular manner, but in accordance with information pertaining to the content of the input image. As a result, histograms generated from a segmentation-result image reflect the information pertaining to the content of the input image. This reduces the influence of the position, size, background clutter and the like of the recognition-target object in the input image in the generic object recognition, and improves the accuracy of recognition in the generic object recognition compared with the conventional technologies.

BRIEF DESCRIPTION OF DRAWINGS

FIG. 4A illustrates the input image.
FIG. 4B illustrates a segmentation-result image.
FIG. 4C illustrates histograms of spatial sub-regions.
FIG. 4D illustrates a histogram of the input image.
FIG. 7A-7D are diagrams illustrating creation of a histogram of an input image.
FIG. 7A illustrates the input image.
FIG. 7B illustrates a segmentation-result image.
FIG. 7C illustrates histograms of spatial sub-regions.
FIG. 7D illustrates a histogram of the input image.

DETAILED DESCRIPTION OF THE INVENTION

<Process by which Embodiment According to Present Invention was Achieved>

The inventors of the present invention devoted intense study to the aforementioned generic object recognition using the SPM.

In the SPM, the input image is equally segmented. Due to this, the histogram computed for the input image may receive influence of the position, size, background clutter and the like of an object targeted to be recognized in the input image, and change depending on the received influence, and decrease the performance of the generic object recognition. The inventors regarded this as a problem to be solved. The following explains about this problem.

Suppose, for example, that the input image is segmented into four equal sub-regions (two equal sub-regions vertically and two equal sub-regions horizontally), and a recognition-target object is included in the upper-left sub-region.

The histogram obtained for the input image is different from a histogram obtained for an image of the upper-left sub-region in which the recognition-target object is included. In this case, if the classifier had learned a lot of images in which the recognition-target object is included in the lower-right sub-region, the recognition accuracy of the recognition-target object in the input image of the above case by the classifier becomes lower than in images in which the recognition-target object is included in the lower-right sub-region.

Also, with regard to the size and the background clutter of the recognition-target object, for example, suppose that a small-sized image of the recognition-target object is included in a sub-region of the input image.

In this case, the influence of the feature of the background of this sub-region in the histogram becomes large and conversely the influence of the feature of the recognition-target object becomes small, compared with the case where a large-sized image of the recognition-target object is included. Accordingly, in this case, the recognition-target object is less likely to match any of images (results of learning) that had been learned by the classifier, and the recognition accuracy of the recognition-target object in this input image becomes lower than in images in which a large-sized image of the recognition-target object is included.

With a great deal of study, the inventors learned that, when an input image is segmented based on information pertaining to the content of the input image, not being segmented regularly into equal sub-regions, the information pertaining to the content of the input image is reflected on the histograms that are generated from the segmentation-result image, and the influence of the position, size, background clutter and the like of the recognition-target object in the input image in the generic object recognition is reduced. Based on this finding, the inventors reached the present invention.

<1. Summary>

Figure 1:
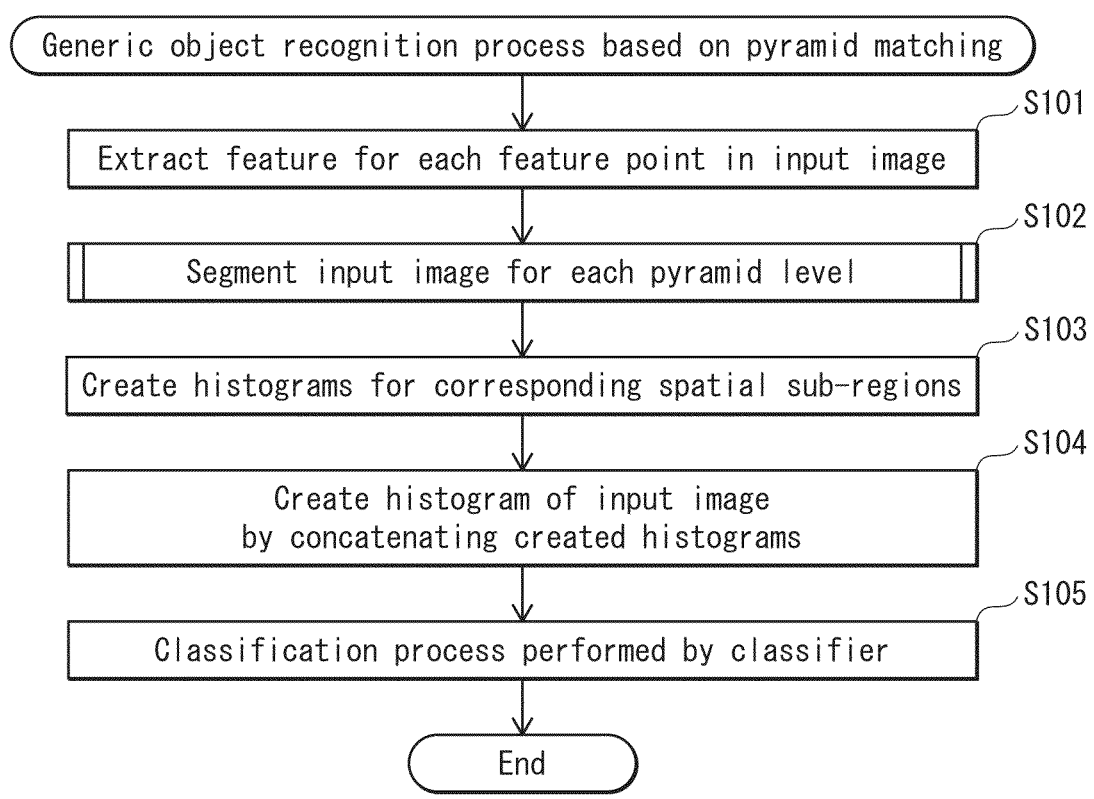
FIG. 1 is a flowchart illustrating a flow of a generic object recognition process based on the pyramid matching.

FIG. 1 is a flowchart illustrating the procedure of a generic object recognition process based on the pyramid matching performed by an image recognition device in one embodiment of the present invention.

The generic object recognition process based on the pyramid matching includes: a process of extracting feature for each feature point in the input image (S101); a process of segmenting the input image hierarchically (S102); a process of generating histograms for corresponding spatial sub-regions obtained by the segmentation, each histogram representing the feature of a spatial sub-region (S103); a process of generating a histogram of the input image which represents the feature of the input image, from the histograms of the spatial sub-regions (S104); and a classification process in which the classifier determines, by using the histogram of the input image, whether or not a recognition-target object is present in the input image (S105).

Among these processes, the present invention is characterized by the "process of segmenting the input image hierarchically (S102)".

Here, "hierarchically segmenting" an input image means to segment the input image into increasingly fine sub-regions as in, for example, segmenting the input image (pyramid level 0) into a plurality of sub-regions (pyramid level 1) (hereinafter the sub-regions are referred to as "spatial sub-regions"), and further segmenting each of the spatial sub-regions into a plurality of sub-regions (pyramid level 2).

Figure 8A:
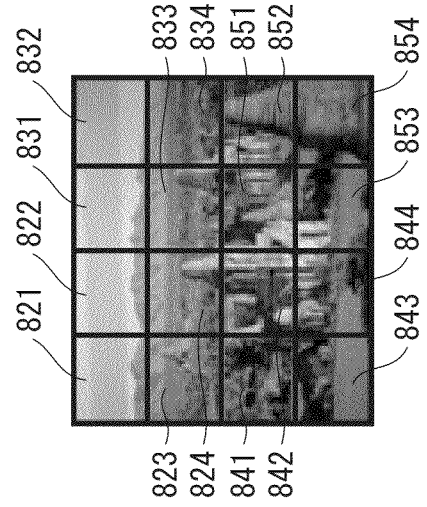
FIG. 8A schematically illustrates one example of an input image (pyramid level 0) in a general pyramid matching and a histogram of the input image.
Figure 8B:
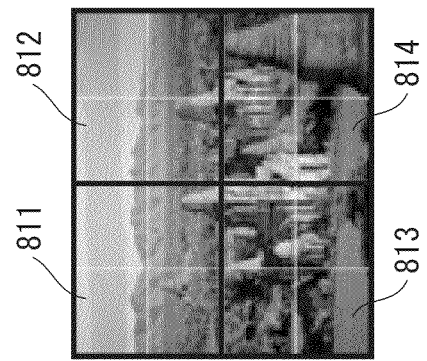
FIG. 8B schematically illustrates one example of segmented images in pyramid level 1 and histograms of the segmented images.
Figure 8C:
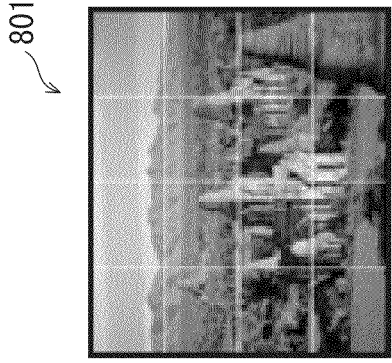
FIG. 8C schematically illustrates one example of segmented images in pyramid level 2 and histograms of the segmented images.

Here, in the case of a general pyramid matching (Spatial Pyramid Matching: SPM), an input image is hierarchically segmented into spatial sub-regions by equal segmentation. More specifically, as illustrated in FIGS. 8A-8C as one example, an input image 801 is first equally segmented into N (in the example of FIG. 8B, four) sub-regions (spatial sub-regions 811-814: two sub-regions vertically and two sub-regions horizontally), and each of the sub-regions generated by the first segmentation is further equally segmented into N sub-regions (spatial sub-regions 821-824, 831-834, 841-844, and 851-854).

From the spatial sub-regions obtained by the equal segmentation, histograms (801H, 811H-814H, 821H-824H, 831H-834H, 841H-844H, and 851H-854H) representing the features of the respective spatial sub-regions are then generated, respectively. A final histogram of the input image is obtained by, for example, concatenating the histograms 801H, 811H-814H, 821H-824H, 831H-834H, 841H-844H, and 851H-854H horizontally.

However, when, as in the case of this conventional technology, the input image is equally segmented into sub-regions in a regular manner, the histogram generated from the input image receives an influence of the position, size, background clutter and the like of an object targeted to be recognized in the input image, and the generic object recognition ability of the classifier may be decreased when this histogram is used.

In view of this, in the present embodiment, in step S102, the input image is not segmented in a regular manner as in the equal segmentation, but a semantic map is generated from the input image for each pyramid level and the input image is segmented by using the semantic map.

The semantic map is a map representing semantic information extracted from the input image and is generated by segmenting a score map into a plurality of levels based on a plurality of thresholds, wherein the score map is generated by mapping, for each of the pixels constituting the input image, the probability of being a pixel pertaining to a recognition-target object.

In the present embodiment, a location map is used as one example of the semantic map. The location map is generated by segmenting a score map into a plurality of (in the present embodiment, four) levels, wherein the score map is generated by mapping, for each of the pixels constituting the input image, the probability of being part of a recognition-target object.

A histogram is generated for each of spatial sub-regions that are obtained by the segmentation based on the semantic map. In this case, each histogram reflects, for each of the pixels constituting the corresponding spatial sub-region, the probability of being part of a recognition-target object.

For example, a histogram of a spatial sub-region corresponding to a level-1 (the strongest probability of being part of a recognition-target object) region in the location map is a histogram that clearly reflects a feature of the recognition-target object, and is not likely to reflect a feature of the background clutter.

The histogram of the spatial sub-region corresponding to the level-1 region is concatenated as a part of the histogram of the input image. That is to say, the histogram of the input image includes a part that clearly reflects a feature of the recognition-target object. Accordingly, when the classifier uses this histogram, the probability of recognizing the recognition-target object increases.

Also, the same histogram is generated from the input image regardless of the position of the level-1 region in the input image. That is to say, the region having the strongest probability of being part of a recognition-target object is free of the influence of the position and size.

As described above, in the present embodiment, the input image is segmented into sub-regions based on the semantic map. This decreases the adverse influence of the position, size and the like of an object in the input image, and improves the accuracy of the generic object recognition.

The following describes the present embodiment in more details.

<2. Structure>

The following describes the structure of an image recognition device 200 for performing a generic object recognition in one embodiment of the present invention.

Figure 2:
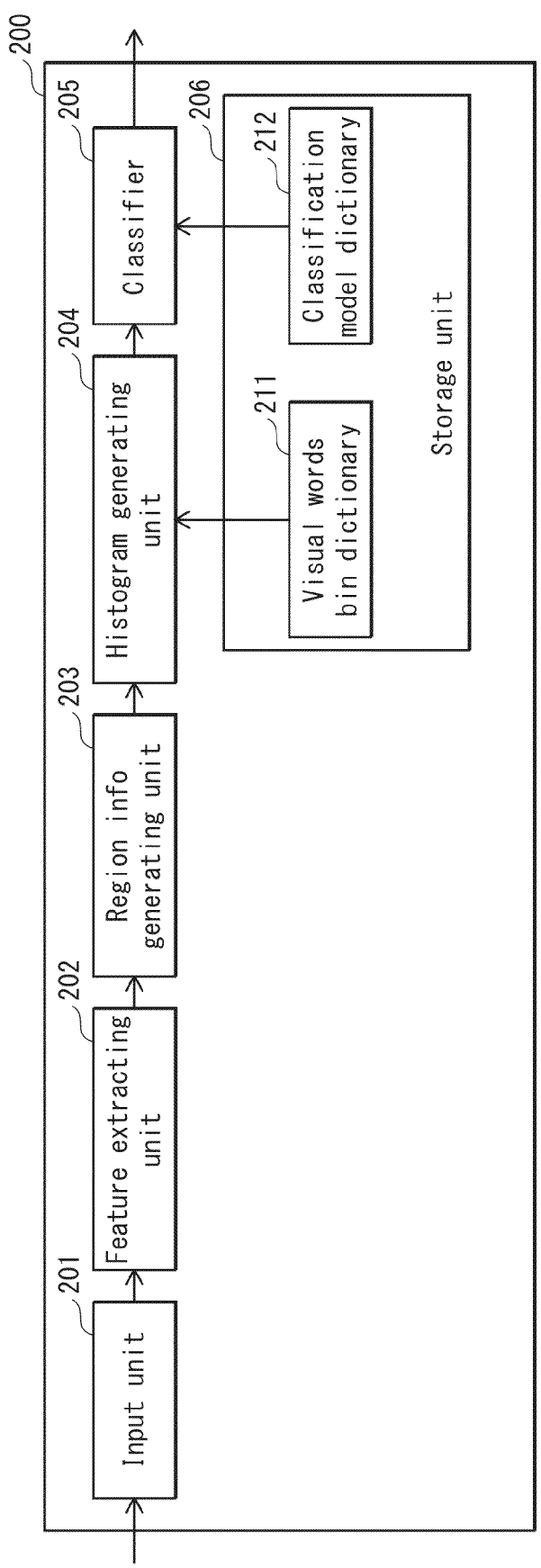
FIG. 2 is a block diagram illustrating a structure of image recognition device 200.

FIG. 2 is a block diagram illustrating the structure of the image recognition device 200.

As illustrated in FIG. 2, the image recognition device 200 includes an input unit 201, a feature extracting unit 202, a region information generating unit 203, a histogram generating unit 204, a classifier 205, and a storage unit 206.

The image recognition device 200 further includes a processor and a memory. The functions of the feature extracting unit 202, region information generating unit 203, histogram generating unit 204, and classifier 205 are realized when program stored in the memory is executed by the processor.

(1) Input Unit 201

The input unit 201 includes a communication LSI or a memory access IC, and has a function to obtain an input image via communication or by reading it from a memory device.

(2) Feature Extracting Unit 202

The feature extracting unit 202 has a function to select feature points in an input image and extract feature for each feature point. The process related to this function corresponds to step S101 illustrated in FIG. 1.

Specifically, the function of extracting feature is realized as follows.

The feature extracting unit 202 first selects feature points in an input image. An feature point is, for example, one of grid points positioned at regular intervals on the input image, and/or a characteristic discrete point. Here, the characteristic discrete point is a characteristic point at which the luminance or shape drastically changes, such as a part of the eye or a tip of the ear of the cat. In the following, the above grid point and discrete point may be collectively referred to as "feature point".

Next, the feature extracting unit 202 extracts a descriptor representing a feature from a region around a feature point.

For the extraction of a descriptor, well-known SIFT (Scale Invariant Feature Transform) algorithm is used as one example. SIFT determines a representative luminance gradient direction for a feature point, and based on the direction, generates luminance gradient histograms of other directions, and describes a feature by a multi-dimensional vector.

(3) Region Information Generating Unit 203

The region information generating unit 203 has a semantic map generating function and an input image segmentation function for segmenting an input image hierarchically into spatial sub-regions by using the semantic map.

<Semantic Map Generating Function>

The region information generating unit 203 generates a semantic map by performing the semantic map generating function. In the present embodiment, the region information generating unit 203 generates a location map as one example of the semantic map.

The location map reveals the location probability of the recognition-target object at each pixel position in the input image, through supervised learning. More specifically, to generate the location map, first a score map is generated by mapping the probability for each pixel of the input image to be a part of the recognition-target object. The location map is then generated by representing the score map with a plurality of (in the present embodiment, four) levels.

Figure 3B:
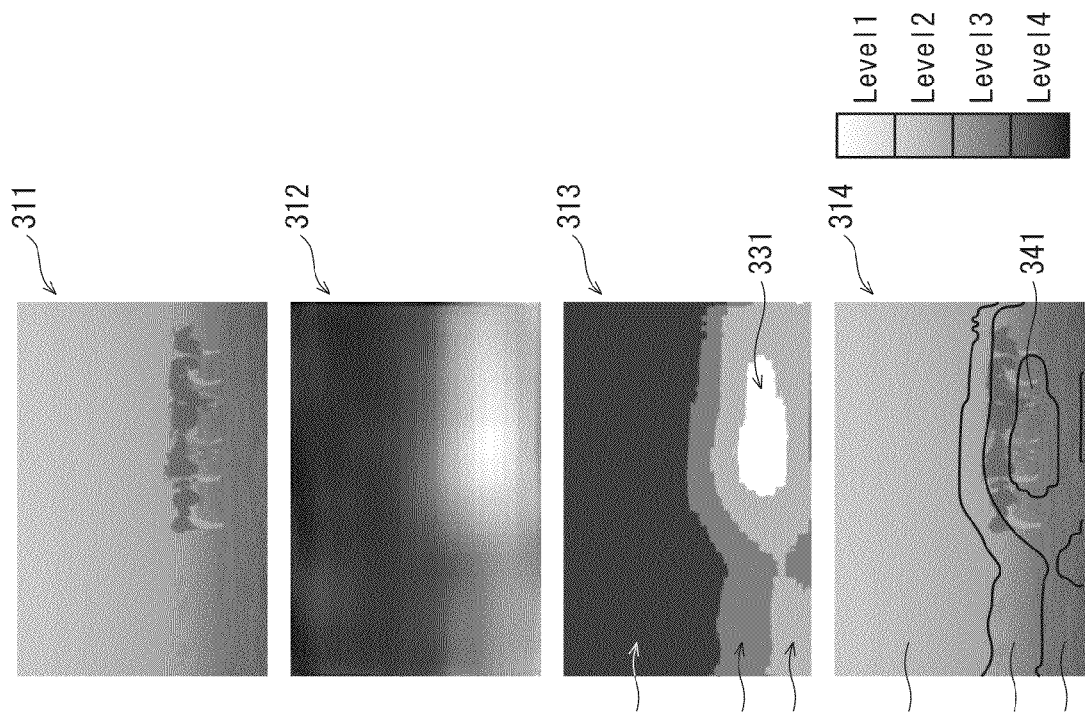
FIG. 3B schematically illustrates one example of images or the like used in the input image segmentation process.
Figure 3A:
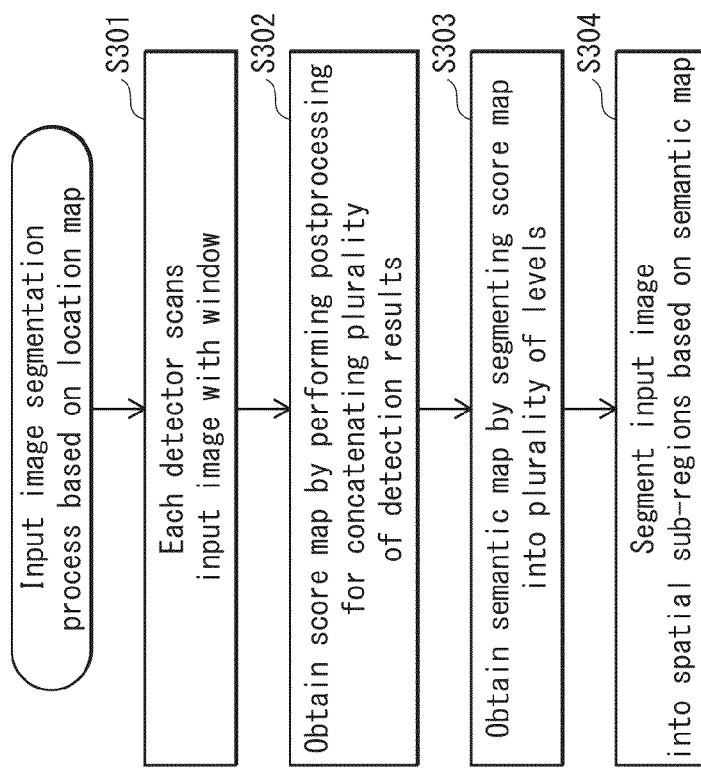
FIG. 3A is a flowchart of an input image segmentation process based on an semantic map (a location map).

The process related to this semantic map generating function corresponds to step S102 illustrated in FIG. 1 and steps S301-S303 illustrated in FIG. 3A.

Note that the region information generating unit 203 uses a plurality of detectors to generate the location map. Each detector learns in advance an image (hereinafter referred to as "element image" for convenience's sake) that represents the recognition-target object or a part of the recognition-target object, such as "front face", "right-side face", "abdomen", or "leg".

The reason for using a plurality of detectors is that there are various faces such as "full face", "right side face", "left side face", "right diagonal face", "left diagonal face", . . . , and there are various face sizes such as "large", "mid-sized", "small", . . . , and it is impossible for one detector to detect all these types of faces.

Note that the location map is described in detail in, for example, 'G. Wang and D. Forsyth, "Joint learning of visual attributes, object classes and visual saliency", In Proceedings of IEEE International Conference on Computer Vision, pages 537-544, 2009'.

<Input Image Segmentation Function>

The input image segmentation function is a function to obtain spatial sub-regions by segmenting an input image hierarchically by using a semantic map. The semantic map is generated for each pyramid level.

The process related to the semantic map generating function corresponds to step S102 illustrated in FIG. 1 and step S304 illustrated in FIG. 3A.

(4) Histogram Generating Unit 204

The histogram generating unit 204 has a function to generate a histogram for each of the spatial sub-regions generated by the region information generating unit 203 and generate a histogram of the input image by concatenating the generated histograms of the sub-regions. The process related to this function corresponds to steps S103 and S104 illustrated in FIG. 1.

The generation of the histogram for each spatial sub-region is realized by voting for a visual words bin that is the most similar to the feature (descriptor) extracted by the feature extracting unit 202, for each feature point included in the spatial sub-region. Here, visual words bins are obtained by vector-quantizing SIFT features. A visual words bin dictionary (211) is generated by performing a machine learning on a group of learning images. The visual words bin dictionary 211 is stored in the storage unit 206 in advance.

The SIFT feature and the histogram generation are well known, thus description of these is omitted here.

(5) Classifier 205

The classifier 205 is, for example, structured from a Support Vector Machine (SVM), has a function (classifying function) to assign an input image to at least one of a plurality of classes by using the histogram of the input image, and determines whether or not the recognition-target object is present in the input image.

Specifically, the classifier 205 compares the histogram of the input image generated by the histogram generating unit 204 with a classification model dictionary 212 stored in the storage unit 206, as a realization of the function to determine whether or not the recognition-target object is present in the input image. This function corresponds to step S105 illustrated in FIG. 1.

Here, the classification model dictionary 212 stores histograms of images that each include a recognition-target object. The classification model dictionary 212 is generated in advance by a machine learning performed on a group of learning images, and is stored in the storage unit 206.

SVM is well known, and further detailed description thereof is omitted here.

(6) Storage Unit 206

The storage unit 206 is a nonvolatile memory, and stores various types of information such as the above-described visual words bin dictionary 211 and classification model dictionary 212.

<3. Operation>

<3-1. Input Image Segmentation Process Based on Semantic Map>

FIGS. 3A and 3B are diagrams illustrating an input image segmentation process in which a location map is used as the semantic map.

FIG. 3A is a flowchart of the input image segmentation process based on the location map, and corresponds to step S102 illustrated in FIG. 1. FIG. 3B schematically illustrates one example of images or the like used in the input image segmentation process.

First, each detector included in the region information generating unit 203 scans the input image with a window of a predetermined size (for example, 8×8 pixels) to detect the aforementioned element images (step S301).

More specifically, each detector detects the element images by scanning an input image (as one example, an input image 311 illustrated in FIG. 3B) with the window. When it detects an element image, the detector also stores a reliability level (accuracy) of the detected element image as well. After this, a reliability map is generated by mapping reliability levels (when no element image is detected, the reliability level is 0) on corresponding regions in the input image.

Next, the region information generating unit 203 generates, as a postprocessing, a score map for each of the pixels that constitute the input image, by using the number of detectors that have detected element images and the reliability map, wherein the score map reveals the location probability of a "recognition-target object" at each pixel position in the input image (step S302).

As one example, with regard to each of the pixels constituting the input image, when the number of detectors that have detected element images is 2 or more and the total of the reliability levels is 0.5 or more, the total of the reliability levels is taken as the location probability of the "recognition-target object" for the pixel.

A score map obtained in this way is a gray-level image (for example, a gray-level image 312 illustrated in FIG. 3B). A position at which the location probability is strong is represented by high brightness, and a position at which the location probability is weak is represented by low brightness.

Subsequently, the region information generating unit 203 obtains a location map (as one example, a location map 313 illustrated in FIG. 3B) by segmenting the score map into the same number of (four, for example) gray-scale levels as the predetermined number of regions generated by the segmentation, by using a predetermined number of (for example, three) thresholds (step S303).

The location map 313 is a gray-level image represented by four gray-scale levels and includes: a region 331 of level 1; a region 332 of level 2; a region 333 of level 3; and a region 334 of level 4.

Lastly, the region information generating unit 203 segments the input image 311 based on the location map 313 (step S304). Boundary lines between a plurality of regions generated by the segmentation of the input image 311 match the boundary lines between a plurality of levels in the location map 313 that are mapped onto the input image 311, as shown in an image 314 of FIG. 3B that illustrates an image after the segmentation. Hereinafter, an image, such as the image 314, that has been segmented into a plurality of regions is referred to as a "segmentation-result image".

That is to say, the input image 311 is segmented into four regions: a region corresponding to level 1 in the location map 313; a region corresponding to level 2; a region corresponding to level 3; and a region corresponding to level 4. The region 331 in the location map 313 has the same location and shape as a region 341 in the segmentation-result image 314. Also, the regions 332, 333 and 334 in the location map 313 have the same location and shape as regions (spatial sub-regions) 342, 343 and 344 in the segmentation-result image 314.

In the above, the input image segmentation process is explained only with regard to pyramid level 1. However, similar processes are performed with regard to pyramid level 2 and lower. Note that, in the present embodiment, the number of pyramid levels is 3. This is because it is said that, in general, two to three pyramid levels are preferable when a recognition process is performed for an object concept of such level as "cow" and "cat".

Note that the gray-level image 312, location map 313 and segmentation-result image 314 are schematic diagrams presented for explanation, and are not correct images or maps actually generated from the input image 311.

<3-2. Generic Object Recognition Process Based on Pyramid Matching>

Figure 4A:
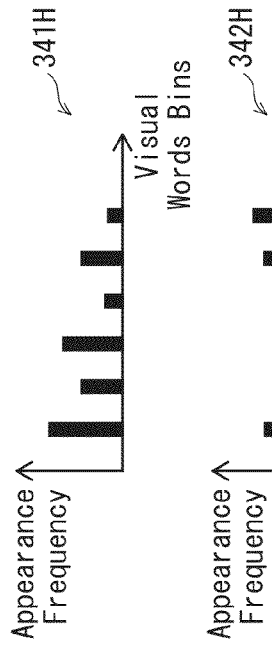
FIGS. 4A-4D illustrate how histograms of an input image are generated.
Figure 4B:
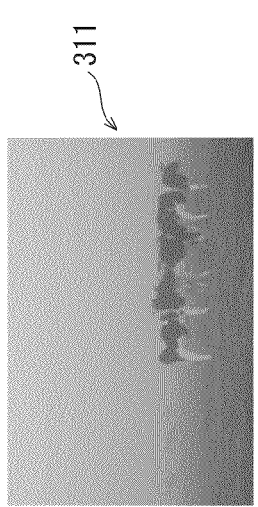
Figure 4C:
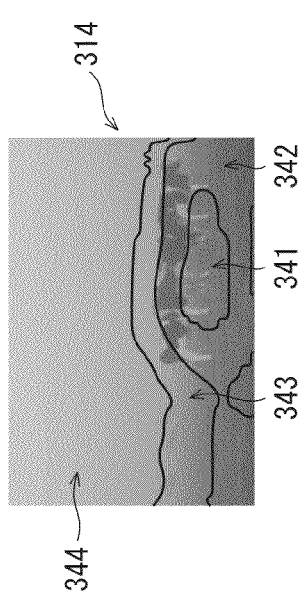
Figure 4D:
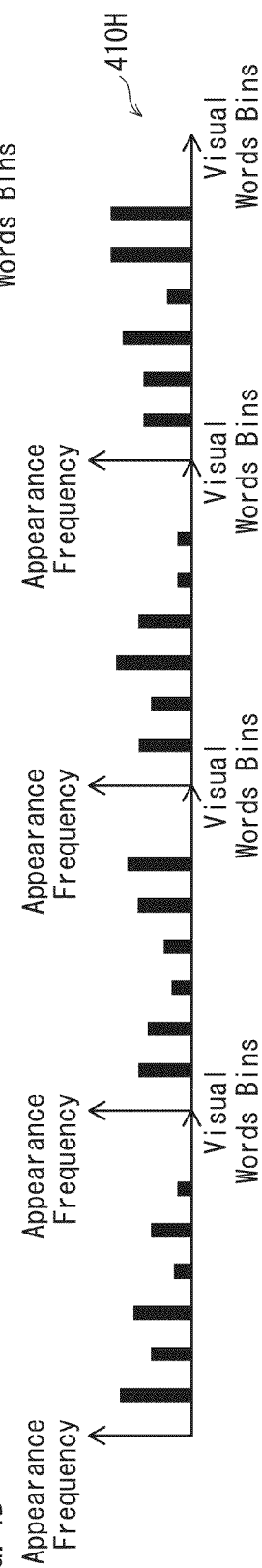
Figure 5:
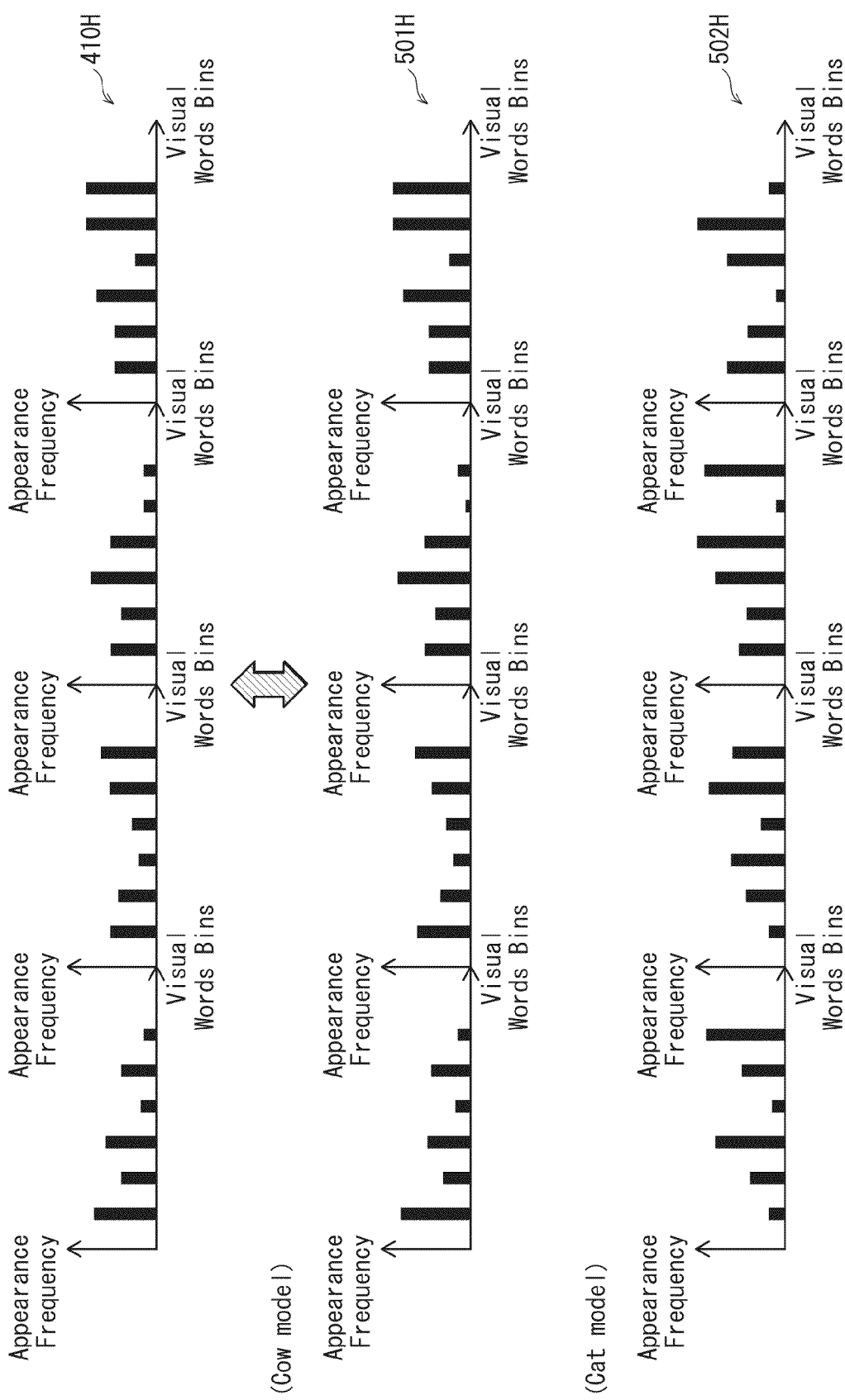
FIG. 5 illustrates how it is judged whether or not a recognition-target object is present, by a matching process using the histogram of the input image.

The following describes the generic object recognition process performed by the image recognition device 200 based on the pyramid matching, with reference to FIGS. 1, 4 and 5.

First, the input unit 201 obtains an input image (for example, an input image 311 illustrated in FIG. 4A), and outputs the input image to the feature extracting unit 202.

The feature extracting unit 202 extracts feature for each feature point in the input image (step S101).

Subsequently, the region information generating unit 203 performs a process of segmenting the input image hierarchically into spatial sub-regions (S102). This process corresponds to the input image segmentation process having already been described with reference to FIGS. 3A and 3B.

Here, it is assumed that a segmentation-result image in pyramid level 1 generated in step S102 is the segmentation-result image 314 illustrated in FIG. 4B, as one example. Note that the segmentation-result image 314 illustrated in FIG. 4B is the same as the segmentation-result image 314 illustrated in FIG. 3B.

Subsequently, the histogram generating unit 204 performs a process of generating histograms of corresponding spatial sub-regions (S103).

FIG. 4C schematically illustrates one example of histograms of the spatial sub-regions in pyramid level 1.

The horizontal axis of each histogram represents an alignment of visual words bins, and the vertical axis represents the appearance frequency of each visual words bin in the input image.

Histogram 341H is a histogram corresponding to spatial sub-region 341. Similarly, histograms 342H-344H are histograms corresponding to spatial sub-regions 342-344, respectively.

The histogram generating unit 204 then creates a histogram of the input image (histogram 410H illustrated in FIG. 4D, as one example) by concatenating the created histograms (S104).

Note that, similarly, a histogram of the input image 311 in pyramid level 0 is created, and histograms of 16 images in pyramid level 2, which are generated by segmenting the input image into 16 sub-regions, are also created. The final histogram of the input image 311 is created by concatenating the histograms of pyramid levels 0, 1 and 2.

Lastly, the classifier 205 judges, by using the histogram of the input image, whether or not the recognition-target object is present in the input image (step S105).

The classifier 205 judges whether or not the recognition-target object is present in the input image.

FIG. 5 illustrates only histogram 410H of pyramid level 1 extracted as the histogram of the input image. However, in the actuality, as described above, a histogram created by concatenating the histograms of pyramid levels 0, 1 and 2 is used as the histogram of the input image. Furthermore, FIG. 5 illustrates histograms 501H and 502H of pyramid level 1 that are histograms representing recognition-target objects and being stored as the classification model dictionary 212. However, in the actuality, histograms created by concatenating the histograms of pyramid levels 0, 1 and 2 are used as the histograms representing recognition-target objects.

<4. Modifications>

Up to now, an image recognition device in one embodiment of the present invention has been described. However, the present invention is not limited to the image recognition device described in the above embodiment, but may be modified as follows.

(1) In the above embodiment, a location map is used as the semantic map. However, it may be sufficient that the semantic map is a map generated by segmenting a score map into a plurality of levels based on a plurality of thresholds, wherein the score map is generated by mapping, for each of the pixels constituting the input image, the probability of being a pixel pertaining to a recognition-target object.

For example, a saliency map may be used as the semantic map.

The saliency map is a map that is created by classifying a score map into a plurality of levels, wherein the score map is created by mapping, for each of the pixels constituting the input image, the strength of visual attraction (probability). Saliency of each pixel location is determined by how distinct the stimulus at the location is from the stimuli within its local or global surroundings. The saliency map reflects, for example, a probability in the pixel level that a sub-region of an image belongs to a foreground or a background.

Figure 6B:
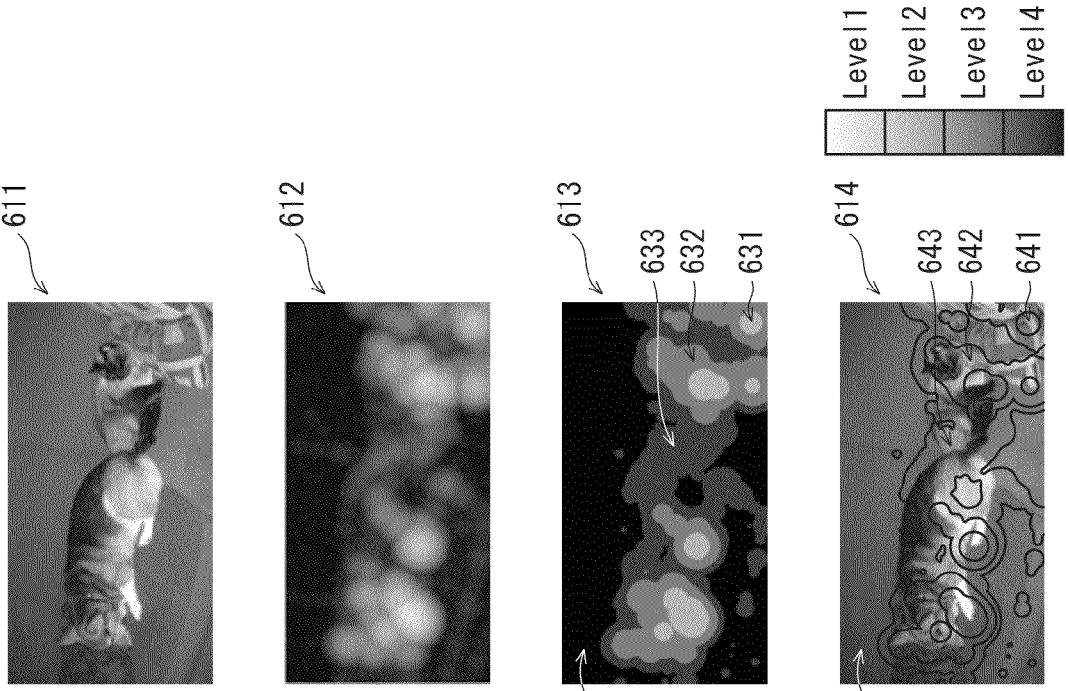
FIG. 6B schematically illustrates one example of image used in the input image segmentation process.
Figure 6A:
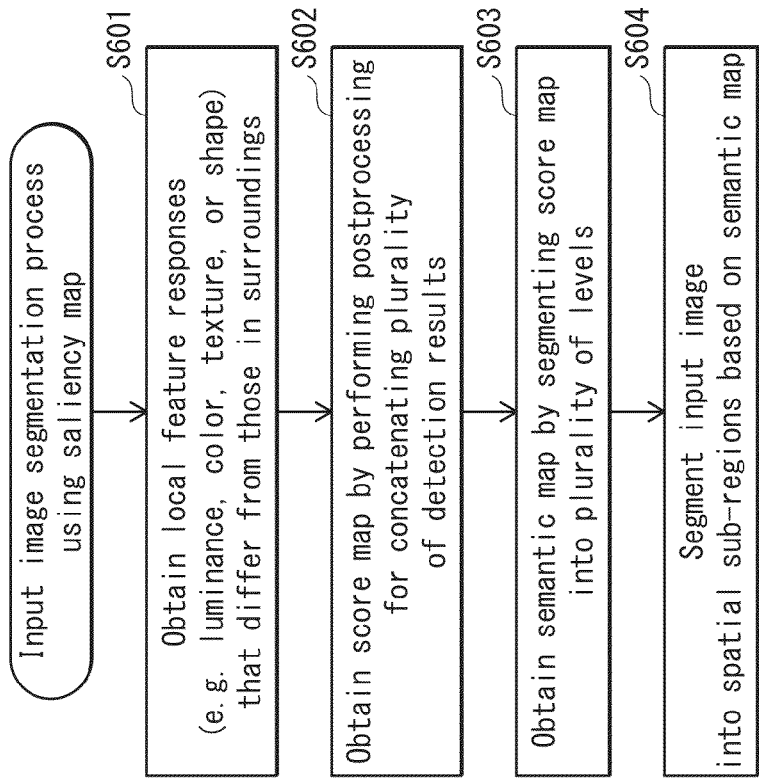
FIG. 6A is a flowchart of the input image segmentation process using a semantic map (a saliency map).

FIG. 6A is a flowchart of the input image segmentation process using a saliency map as the semantic map, and corresponds to step S102 illustrated in FIG. 1.

Also, FIG. 6B schematically illustrates one example of image used in the input image segmentation process.

First, the region information generating unit 203 detects image areas that have, for each of one or more attributes (e.g. luminance, color, texture, or shape), features that differ from those in the surroundings (step S601). Hereinafter, the detection result obtained for each attribute is referred to as "saliency response".

Subsequently, the region information generating unit 203 obtains a score map by performing a postprocessing for concatenating a plurality of saliency responses obtained in step S601 (step S602). In the postprocessing, a score map is obtained by combining a plurality of saliency responses. For example, the score map is obtained by adding up a plurality of saliency responses for the luminance, color, texture, and shape at a predetermined ratio.

The score map indicates the saliency at each pixel position in the image. The score map obtained in this way is represented as a gray-level image (for example, the gray-level image 612 illustrated in FIG. 6B). For example, a position with a high saliency is high in brightness, and a position with a low saliency is low in brightness.

Step S603 is the same as step S303 described above and illustrated in FIG. 3, and step S604 is the same as step S304, and thus description of these steps is omitted here.

Note that the saliency map 613 illustrated in FIG. 6B is one example of a saliency map as the semantic map.

Also, the segmentation-result image 614 illustrated in FIG. 6B is one example of a segmentation-result image in pyramid level 1 that is obtained by segmenting the input image 611 based on the saliency map 613.

Note that the gray-level image 612, location map 616 and segmentation-result image 614 are schematic diagrams presented for explanation, and are not correct images or maps actually generated from the input image 311.

Note that, with regard to the saliency map, refer to, for example, 'Laurent Itti, Christof Koch, and Ernst Niebur, "A model of saliency-based visual attention for rapid scene analysis", IEEE TRANSACTIONS ON PATTERN ANALYSIS AND MACHINE INTELLIGENCE, VOL. 20, NO. 11, NOVEMBER 1998'.

Subsequently, the device performs a process of generating histograms of corresponding spatial sub-regions in the segmentation-result image obtained by segmenting the input image by using the saliency map 613 and the like. This process corresponds to step S103 illustrated in FIG. 1.

FIG. 7A-7D are diagrams illustrating creation of histogram of the input image.

It is assumed here that the input image is, for example, image 611 illustrated in FIG. 7A and the segmentation-result image of pyramid level 1 generated in step S102 is, for example, segmentation-result image 614 illustrated in FIG. 7B. Note that the image 611 illustrated in FIG. 7A is the same as the image 611 illustrated in FIG. 6B, and the segmentation-result image 614 illustrated in FIG. 7B is the same as the segmentation-result image 614 illustrated in FIG. 6B.

FIG. 7C schematically illustrates one example of histograms of the spatial sub-regions in pyramid level 1.

The horizontal axis of each histogram represents an alignment of visual words bins, and the vertical axis represents the appearance frequency of each visual words bin in the input image.

Histogram 641H is a histogram corresponding to spatial sub-region 641. Similarly, histograms 642H-644H are histograms corresponding to spatial sub-regions 642-644, respectively.

The histogram generating unit 204 then creates a histogram of the input image by concatenating the created histograms. This process corresponds to step S104 illustrated in FIG. 1.

Note that, similarly, a histogram of the input image 611 in pyramid level 0 is created, and histograms of 16 images in pyramid level 2, which are generated by segmenting the input image into 16 sub-regions, are also created. The final histogram of the input image 611 is created by concatenating the histograms of pyramid levels 0, 1 and 2.

Lastly, the classifier 205 judges, by using the histogram of the input image, whether or not the recognition-target object is present in the input image.

This process corresponds to step S105 illustrated in FIG. 1. Step S105 has been described in detail already, and further explanation thereof is omitted.

(2) In the above embodiment and modification, a location map or a saliency map is used as the semantic map. However, a map that is created by fusing a plurality of such maps may be used as the semantic map.

For example, respective score maps of a location map and a saliency map may be fused into one score map, and a semantic map may be created from the fused score map.

When different score maps are fused, the score maps may be weighted equally, or weights obtained from learning may be assigned to the score maps respectively.

When a semantic map is created by using a plurality of score maps as described above, the semantic map reflects a plurality of meanings pertaining to the pixels constituting the input image.

Also, a simple geometric segmentation and a segmentation using a semantic map may be combined for use.

(3) In the above embodiment, the SIFT feature is computed as the feature. However, not limited to the SIFT feature, the feature may be represented by any other information. For example, as the feature, Color, HOG (Histogram of Oriented Gradients), LBP (Local Binary Pattern), which are well-known features, or the like may be used, or image data itself may be used.

(4) In the above embodiment, the input image is segmented into increasingly fine sub-regions hierarchically such that the hierarchy is three-pyramid-levels deep (pyramid levels 0, 1 and 2), and each sub-region in a pyramid level is segmented into four sub-regions in a lower pyramid level. However, not limited to these, any depth of hierarchy or number of segmented sub-regions that are obtained from learning or empirical rules or the like may be adopted.

(5) In the above embodiment, the classifier 205 judges, by using the histogram of the input image generated by the histogram generating unit 204, whether or not the recognition-target object is present in the input image. However, not limited to this, it may be sufficient to check on the recognition-target object by using the histogram generated by the histogram generating unit 204. For example, the classifier 205 may operate as a detector to detect a recognition-target object present in the input image, by using the histogram generated by the histogram generating unit 204.

(6) In the above embodiment, the classifier 205 is structured from an SVM. However, the classifier 205 may be replaced by another element that can assign the input image to at least one of a plurality of classes.

For example, the matching processing technology may be applied.

The following explains one example of this. That is to say, a classification model dictionary 212, which is generated based on a machine learning performed on a group of learning images, is stored in the storage unit 206 in advance.

The classification model dictionary 212 includes histograms of the cases where each recognition-target object is present in the image (for example, a histogram 501H illustrated in FIG. 5 for the case where the recognition-target object is a "cow", and a histogram 502H for the case where the recognition-target object is a "cat"). The classifier 205 compares the histogram of the input image with each histogram in the classification model dictionary 212, and computes the level of matching therebetween. The classifier 205 then judges whether or not each matching level is at least a predetermined ratio value. When a matching level is equal to or higher than the predetermined value, the classifier 205 determines that the recognition-target object is present in the input image, and when the matching level is lower than the predetermined value, the classifier 205 determines that the recognition-target object is not present in the input image.

A control program composed of program code written in a machine-language or high-level-language for causing the processor of the image recognition device 200 and various types of circuits connected with the processor to perform the above-described processes of extracting features, generating the semantic map, segmenting the input image, generating the histogram, judging whether or not the recognition-target object is present, and other processes may be recorded on a recording medium, or distributed via any of various types of communication paths.

The above-mentioned recording medium may be an IC card, a hard disk, an optical disc, a flexible disk, a ROM, a flash memory or the like. The distributed control program is stored in a memory or the like so as to be read by a processor, and the processor executes the control program to realize the functions described in the above embodiment.

Note that the processor may execute the control program directly or after compilation or interpretation by an interpreter.

(8) The functional structural elements described in the above embodiment (the input unit 201, feature extracting unit 202, region information generating unit 203, histogram generating unit 204, classifier 205 and the like) may be realized as circuits that perform the respective functions, or realized as execution of one or more programs by one or more processors.

Each of the above-described functional structural elements may be realized as an LSI that is an integrated circuit. Each of the above-described functional structural elements may be realized on one chip, or part or all thereof may be achieved on one chip. Although the term LSI is used here, it may be called IC, system LSI, super LSI, ultra LSI or the like, depending on the level of integration. The method for realizing the integrated circuits is not limited to the LSI, but the integrated circuits may be realized by dedicated circuits or general-purpose processors. It is also possible to use the FPGA (Field Programmable Gate Array), with which a programming is available after the LSI is manufactured, or the reconfigurable processor that can re-configure the connection or setting of the circuit cells within the LSI. Furthermore, a technology for an integrated circuit that replaces the LSI may appear in the near future as the semiconductor technology improves or branches into other technologies. In that case, the new technology may be incorporated into the integration of the functional blocks constituting the present invention as described above. Such possible technologies include biotechnology.

(9) The present invention may be any partial combination of the above-described embodiment and modifications.

<5. Supplementary Notes>

The following describes the structure of an image recognition device as one embodiment of the present invention, and its modifications and effects.

(1) An image recognition device as one embodiment of the present invention is an image recognition device for performing a generic object recognition, comprising: a segmenting unit configured to segment an input image into a plurality of regions in accordance with meanings extracted from content of the input image; a generating unit configured to compute feature data for each of the plurality of regions and generate feature data of the input image reflecting the computed feature data; and a checking unit configured to check whether or not a recognition-target object is present in the input image in accordance with the feature data of the input image.

With the above-described structure, the image recognition device of the present invention segments the input image not equally in a regular manner, but in accordance with information pertaining to the content of the input image. As a result, histograms generated from a segmentation-result image reflect the information pertaining to the content of the input image. This reduces the influence of the position, size, background clutter and the like of the recognition-target object in the input image in the generic object recognition, and improves the accuracy of recognition in the generic object recognition compared with the conventional technologies.

It should be noted that the term "checking" used here includes both "classifying" and "detecting".

(2) In the above image recognition device, the segmenting unit may generate a score map by mapping, for each of a plurality of pixels constituting the input image, a probability of being a pixel pertaining to the recognition-target object, generate a semantic map by segmenting the score map into a plurality of levels by using a plurality of thresholds, and use the semantic map as information representing the meanings extracted from the content of the input image.

With the above-described structure, the input image is segmented for each level of probability pertaining to the recognition-target object. As a result, the feature data generated from a region having a high probability of being a pixel pertaining to the recognition-target object strongly shows the feature of the recognition-target object regardless of the position or size of the recognition-target object. Since, in this way, the feature data of the input image strongly shows the features of the recognition-target object, the present invention improves the accuracy of the generic object recognition compared with the conventional technologies.

(3) In the above image recognition device, the segmenting unit may generate the score map by mapping, for each of the pixels constituting the input image, a probability of being a pixel representing a part of the recognition-target object.

With the above-described structure, the input image is segmented for each level of probability of being a pixel representing a part of the recognition-target object. As a result, the feature data generated from a region having a high probability of being a pixel pertaining to the recognition-target object strongly shows the feature of the recognition-target object regardless of the position or size of the recognition-target object. Since, in this way, the feature data of the input image strongly shows the features of the recognition-target object, the present invention improves the accuracy of the generic object recognition compared with the conventional technologies.

(4) In the above image recognition device, the segmenting unit may generate the score map by mapping, for each of the pixels constituting the input image, a level of saliency determined from comparison with surrounding pixels.

With the above-described structure, the input image is segmented for each level of attracting visual attention. As a result, the feature data generated from a region having a high level of attracting visual attention strongly shows the feature of the recognition-target object that highly attracts visual attention, regardless of the position or size of the recognition-target object. Since, in this way, the feature data of the input image strongly shows the features of the recognition-target object, the present invention improves the accuracy of the generic object recognition compared with the conventional technologies.

(5) In the above image recognition device, the segmenting unit may segment the input image hierarchically by using the semantic map.

With the above-described structure, the image recognition device reduces the influence of the position, size, background clutter and the like of an object that is targeted to be recognized in the input image by the generic object recognition, and improves the accuracy of the generic object recognition compared with the conventional technologies.

(6) In the above image recognition device, the checking unit may be a classifier having information obtained as a result of learning one or more images, and as the checking, judge, by using the information, whether or not the recognition-target object is present in the input image.

An image recognition method as one embodiment of the present invention is an image recognition method for use in an image recognition device for performing a generic object recognition, the image recognition device including a segmenting unit, a generating unit, and a checking unit, the image recognition method comprising: causing the segmenting unit to segment an input image into a plurality of regions in accordance with meanings extracted from content of the input image; causing the generating unit to compute feature data for each of the plurality of regions and generate feature data of the input image reflecting the computed feature data; and causing the checking unit to check whether or not a recognition-target object is present in the input image in accordance with the feature data of the input image.

An integrated circuit as one embodiment of the present invention is an integrated circuit for use in an image recognition device for performing a generic object recognition, the integrated circuit comprising: a segmenting unit configured to segment an input image into a plurality of regions in accordance with meanings extracted from content of the input image; a generating unit configured to compute feature data for each of the plurality of regions and generate feature data of the input image reflecting the computed feature data; and a checking unit configured to check whether or not a recognition-target object is present in the input image in accordance with the feature data of the input image.

With the above-described structure, the present invention segments the input image not equally in a regular manner, but in accordance with information pertaining to the content of the input image. As a result, histograms generated from a segmentation-result image reflect the information pertaining to the content of the input image. This reduces the influence of the position, size, background clutter and the like of the recognition-target object in the input image in the generic object recognition, and improves the accuracy of recognition in the generic object recognition compared with the conventional technologies.

The image recognition device according to one aspect of the present invention reduces the influence of the position, size, background clutter and the like of the recognition-target object in the input image in the generic object recognition, improves the accuracy of the generic object recognition, and thus is suitable for, for example, a device for classifying and managing photographs showing general objects.

REFERENCE SIGNS LIST 200 image recognition device
201 input unit
202 feature extracting unit
203 region information generating unit
204 histogram generating unit
205 classifier
206 storage unit
211 visual words bin dictionary
212 classification model dictionary
311 input image
312 gray-level image
313 location map
314 segmentation-result image

The invention claimed is:

1. An image recognition device for performing a generic object recognition using spatial pyramid matching, comprising:
 a non-transitory memory storing a program; and
 a hardware processor configured to execute the program and to cause the image recognition device to operate as the following units stored in the non-transitory memory:
 a segmenting unit configured to segment an input image by pyramid matching into a plurality of increasingly fine regions in accordance with information extracted from content of the input image;
 a generating unit configured to compute feature data for each of the plurality of regions and generate feature data of the input image reflecting the computed feature data; and
 a checking unit configured to check whether or not a recognition-target object is present in the input image in accordance with the feature data of the input image:
 wherein the segmenting unit generates a score map by mapping, for each of a plurality of pixels constituting the input image, a probability of being a pixel pertaining to the recognition-target object, generates a semantic map by segmenting the score map into a plurality of levels by using a plurality of thresholds, and uses the semantic map as information representing the information extracted from the content of the input image.

2. The image recognition device of claim 1, wherein the segmenting unit generates the score map by mapping, for each of the pixels constituting the input image, a probability of being a pixel representing a part of the recognition-target object.

3. The image recognition device of claim 1, wherein the segmenting unit generates the score map by mapping, for each of the pixels constituting the input image, a level of saliency determined from comparison with surrounding pixels.

4. The image recognition device of claim 1, wherein the segmenting unit segments the input image hierarchically by using the semantic map.

5. The image recognition device of claim 1, wherein the checking unit is a classifier having information obtained as a result of learning one or more images, and as the checking, judges, by using the information, whether or not the recognition-target object is present in the input image.

6. An image recognition method for use in an image recognition device for performing a generic object recognition, the image recognition device including a segmenting unit, a generating unit, and a checking unit, the image recognition method comprising:
 a segmenting step in which the segmenting unit segments an input image into a plurality of regions in accordance with information extracted from content of the input image;
 a generating step in which the generating unit computes feature data for each of the plurality of regions and generates feature data of the input image reflecting the computed feature data; and
 a checking step in which the checking unit checks whether or not a recognition-target object is present in the input image in accordance with the feature data of the input image.

7. An integrated circuit for use in an image recognition device for performing a generic object recognition, the integrated circuit comprising:
 a segmenting unit configured to segment an input image into a plurality of regions in accordance with information extracted from content of the input image;
 a generating unit configured to compute feature data for each of the plurality of regions and generate feature data of the input image reflecting the computed feature data; and
 a checking unit configured to check whether or not a recognition-target object is present in the input image in accordance with the feature data of the input image.

* * * * *